United States Patent [15] 3,673,561
Bronstein [45] June 27, 1972

[54] STEERING INDICATOR

[72] Inventor: Harry Bronstein, 9872 Bridle Road, Philadelphia, Pa. 19115

[22] Filed: Aug. 6, 1969

[21] Appl. No.: 847,863

[52] U.S. Cl. ..............................340/52 R, 116/31, 340/282
[51] Int. Cl...........................................................B60g 1/00
[58] Field of Search..............................340/52, 282; 116/31

[56] References Cited

UNITED STATES PATENTS

| | | | |
|---|---|---|---|
| 2,754,499 | 7/1956 | Jost | 340/52 |
| 2,783,463 | 2/1957 | Fogiel | 340/52 |
| 2,957,442 | 10/1960 | Coon | 116/31 |

Primary Examiner—John W. Caldwell
Assistant Examiner—Glen R. Swann, III
Attorney—Caesar, Rivise, Bernstein & Cohen

[57] ABSTRACT

A steering indicator including gearing to transmit rotation of the steering shaft of an automobile to a worm drive gear. Movement of the worm drive gear changes the position of the pair of insulated brushes which makes contact along resistance areas and this has the effect of changing the resistance in two circuits. One circuit involves an indicating meter, such that a given amount of rotation of the steering shaft causes a change in circuit resistance to cause corresponding deflection of the indicating meter, thereby giving the reading of the front wheels position. The second circuit includes a pair of indicator lights, such that change of resistance in the second circuit causes one of the lights to glow more brightly as the steering wheel is turned further away from its straight ahead position to give additional warning to the driver.

10 Claims, 7 Drawing Figures

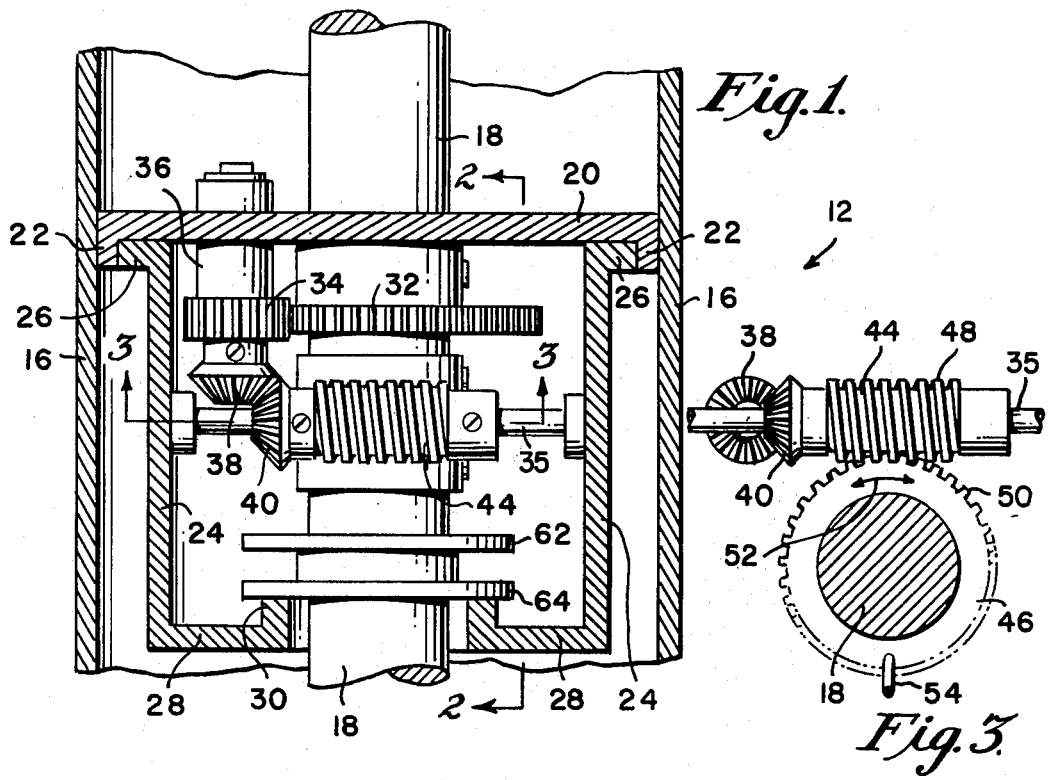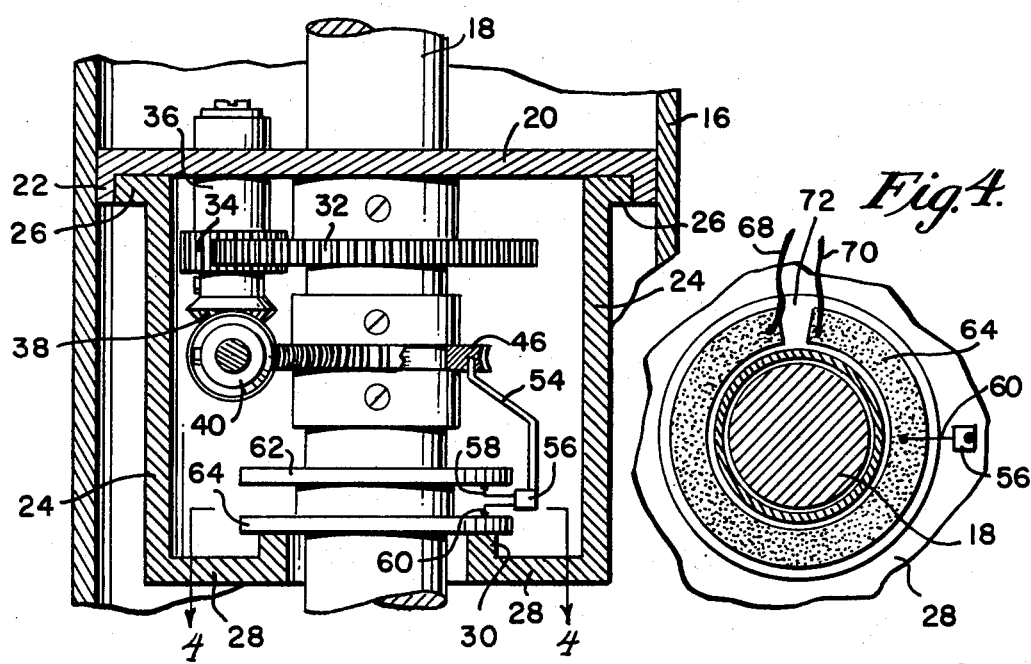

INVENTOR.
HARRY BRONSTEIN
BY
Caesar, Rivise,
Bernstein & Cohen
ATTORNEYS.

STEERING INDICATOR

This invention relates to a steering indicator, and has as its objective the provision of a new and improved device of this general class. Over the years it has been recognized that there should be some type of indicating device located on the dashboard of an automobile in order that the driver may be given a visual indication of the position of the front wheels of an automobile.

Accordingly, there have been a series of proposals, but apparently none of these have ever been incorporated on a commercial scale during the history of the automobile.

With the advent of power steering, it was recognized that the new ease of turning the wheels of an automobile created a substantial risk that there would be times when the driver would not be able to sense the position of the front wheels of the automobile. This ease of turning the front wheels of the automobile becomes even more dangerous in wet or slippery weather. Nevertheless, there still does not exist on the market any commercially available devices which can be installed in an automobile in order to give the driver a visual indication of the position of the front wheels of the automobile.

While it is recognized that a steering indicator is useful to assist in the parking of the automobile, there are other situations encountered in driving an automobile where a steering indicator would prove to be invaluable.

In parking a car on a grade a steering indicator would warn the driver when the front wheels have not been angled sufficiently toward the curb. Even when the wheels have been cut hard against the curb it is possible that the wheels may still have not been turned at a sufficient angle because the car was too close to the curb.

On starting a parked car the driver may not be aware that the front wheels are turned outwardly or inwardly, and so the car may cut directly into a traffic lane or over a curb. Thus, a steering indicator would inform the driver as to the position of the front wheels so as to eliminate the dangerous possibility.

It is therefore an object of the invention to eliminate the foregoing dangerous situations by providing a reliable steering indicator device. The present invention also incorporates indicator lamps, and this can prove to be an invaluable aid to a drowsy motorist or passengers should the automobile start to weave from side to side since the indicator lamps of the present invention will flash brighter and dimmer, and thus alerting to this dangerous condition.

It is yet another object of the present invention to provide a steering wheel indicator which is relatively low in cost and which can be easily incorporated by the manufacturer into the steering column assembly of the automobile on the assembly line. Alternatively, the present invention may be provided in a self-contained unit that can be simply installed by a mechanic of ordinary skill into an automobile that has already left the factory, with the device of the present invention being incorporated into a rather compact and inexpensive unit.

The foregoing as well as other objects of the invention will become better known and appreciated by reference to the following figures of the drawing and accompanying the description thereof wherein:

FIG. 1 is a sectional view showing the actuating portion of the steering indicator of the present invention installed upon a steering shaft, and inside a steering column as would normally be done by an automobile manufacturer;

FIG. 2 is a sectional view taken along the lines 2—2 of FIG. 1;

FIG. 3 is a sectional view taken along the lines 3—3 of FIG. 1;

FIG. 4 is a somewhat enlarged sectional view taken along the lines 4—4 of FIG. 2;

Figure 6:
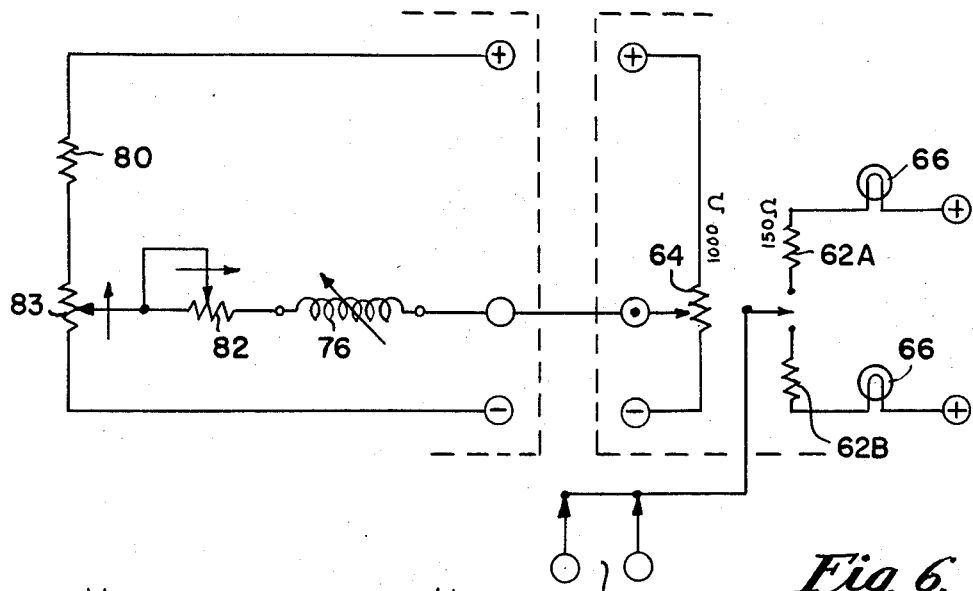
FIG. 6 is a wiring diagram showing the circuitry involved in the steering indicator of FIG. 1.

Referring now to the various figures of the drawing wherein like reference characters refer to like parts, there is shown in FIG. 1 a portion of the steering column of an automobile which has been equipped by an automobile manufacturer with the actuating portion 12 of a steering indicator device of the present invention. FIG. 1 shows a portion of the device including the gearing and certain of the electrical components and electrical actuation elements.

Figure 5:
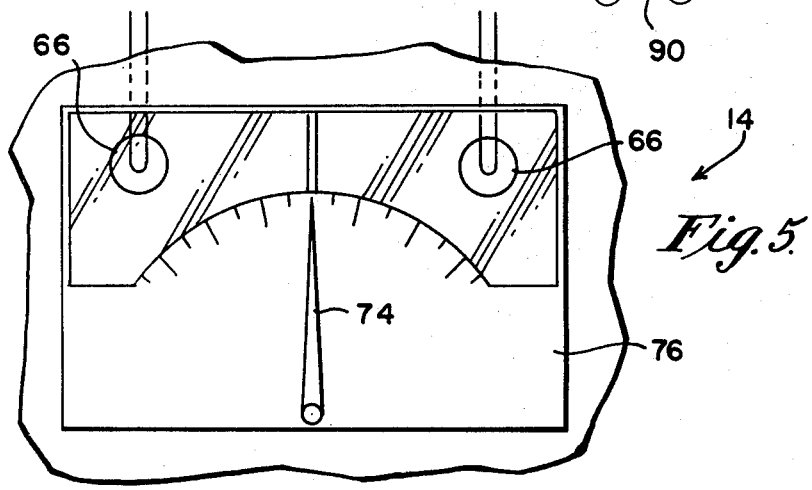
FIG. 5 is a view showing the indicating portion of the steering indicator device of the present invention as it might appear when installed upon the dashboard of an automobile.

FIG. 5 shows indicating portion 14 of the present invention, with the circuitry being shown in FIG. 6.

With reference to FIG. 1 there is shown a portion of the steering column of an automobile or other vehicle with other associated parts which are well known to those in the automotive arts. Only an added construction necessitated by the present invention will be discussed in detail.

In particular FIG. 1 shows a portion of steering column 16 including steering shaft 18. FIG. 1 shows a steering shaft being equipped with the present invention as could be done by an automobile manufacturer. It will be seen that the steering column is fitted with a top plate 20 with an opening to permit the passage of the steering shaft 18. The top plate 20 also has flared ends 22 which abut the interior wall of the steering column 16. Within the steering column 16 there is positioned a housing 24 including flared ends 26 which abut the flared ends 22. The housing 24 terminates in lower walls 28 and upstanding flange 30.

It will be seen that the first gear 32 is attached to the steering shaft 18 for rotation therewith. The gear 32 meshes with a spur gear 34 that is supported by upstanding bearing 36 in the top plate 20. Both spur 34 and a first bevel gear 38 are pinned to the shaft 36. The bevel gear 38 meshes with a bevel gear 40 which is attached to the shaft 35.

It will be seen from FIG. 3 that rotation of worm 44 in turn causes rotation of resistance varying worm gear 46 by virtue of the engagement of teeth 48 of the worm 44 and complementary teeth 50 of the resistance worm gear 46.

As shown in FIG. 2 and 3 there is a bracket arm 54 attached to the resistance worm gear 46. The arm 54 extends downwardly to a joint 56 from which extends insulated brushes 58 and 60.

It will be seen from FIG. 2 that the brush 58 is in movable contact with upper resistance 62 which is in the circuit of lights 66 of FIG. 6 as will be described hereinafter.

As can be seen in FIGS. 2 and 4 the other brush 60 is in contact with meter resistance 64 having power leads 68 and 70. Resistances 62 and 64 are respectively 300 ohms and 1,000 ohms.

As seen in FIG. 4, the meter resistance 64 has but one gap 72 whereas the light resistance 62 will have not only a gap, like the gap 72, but also a second gap (not shown) which is removed a full 180° from the gap 72. In this way the two resistance areas of light resistance 62 are divided into two opposing C-shaped segments separated by two gaps, whereas the meter resistance 64 is but a single continuous segment except for the gap 72.

In view of the foregoing it will be seen that the brushes 58 and 60 will move together as a unit in accordance with the oscillation of the resistance worm gear 50 as determined by the turning of the worm 44. It will be seen that only a portion of the meter resistance 64 is effective, depending upon the position of the brush 60. Similarly, with respect to the light resistance 62 only a portion of either one of the two resistance segments will be effective at any particular time.

As an example of the foregoing, it will be assumed that the wheels of the automobile be cut hard to the right. The needle 74 of the meter 76 (FIG. 5) will then show a full deflection to the right. For purposes of carrying out the present invention, the brush 60 will be at such a position as to allow a minimum of resistance in the meter circuit in order to obtain the full right deflection of needle 74. At the same time the brush 58 will be at a similar position in contact with one of the segments of resistance 62 so that the right hand bulb 66 of FIG. 5 will glow brightly. This is because of the minimum amount of resistance in the circuit of the right hand bulb by virtue of the position of brush 58.

The wheels of the automobile then may be cut to a full left turn. Now, the position of the brush 60 will be moved to place a maximum amount of resistance in the meter circuit so that the needle 74 will deflect to the full left. At the same time the brush 58 of the light circuit is now in contact with the other C-shaped resistance segment, but in such a position to place a minimum amount of resistance in a circuit of the left hand bulb 66 of FIG. 5, so that this bulb will now glow brightly and the needle is at full deflection to the left. When the wheels of the automobile are centered, the meter needle will center automatically, with the meter resistance being intermediate to its full right position (low resistance) and its full left position (high resistance). At the same time the brush 58 will be located in a gap between the resistance segments constituting the resistance 62 so that neither of the bulbs 66 will glow.

Attention is referred to the schematic diagram of FIG. 6 which shows other features of the circuitry involved with the present invention, including current limiting resistor 80, adjustment balancing resistors 82 and 83 for the meter and resistance 62-A and 62-B which are each in one of the circuits of the lights 66. It will be seen from FIG. 6 that the positive leads are connected to the automotive battery, with there also being negative connections to points of lower potential.

Figure 7:
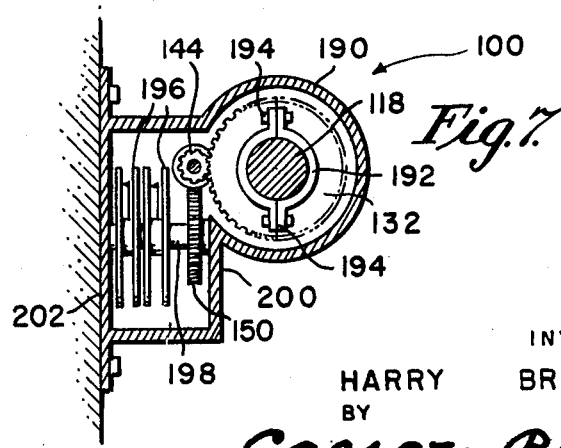
FIG. 7 is another embodiment of the invention showing how a device embodying the present invention can be attached to an exposed steering shaft.

An alternate embodiment of the present invention can be seen in FIG. 7 which is a slight variation of the present invention that enables the present invention to be adapted for a non-factory installation. It will be seen from FIG. 7 that the present invention is embodied in a simple housing that can be easily connected to steering shaft 118. The embodiment 100 of FIG. 7 includes a housing 190. A pair of C-clamps (or equivalent attachment means) with tightening bolts 194 is provided so that a split gear 132 can be held tightly on the steering shaft 118. The split gear 132 meshes with a small spur gear 144 fastened to the shaft of worm which in turn drives a resistance worm gear 150. A pair of rheostats 196 are provided which are connected respectively to the meter and light circuits in the manner of the resistances 62 and 64. The rheostat for the light circuit is of a split nature along the lines of the resistance 62. It will be seen that the two rheostats 196 are mounted on a shaft 198 that is secured for rotation to arm 200 of housing 190 and also against frame 202 of the automobile. It will be seen that the embodiment of FIG. 7 operates on the same principle as the embodiment of FIGS. 1 to 6.

It is thus seen that the present invention constitutes an excellent steering indicator. When the wheels of the automobile are cut hard, the meter needle not only indicates the position of the wheels, but one of the indicator lights 66 will glow brightly to serve as a warning to the driver. It will be seen that the present invention fulfills all objects set forth hereinabove.

Without further elaboration, the foregoing will so fully illustrate my invention that others may, by applying current or future knowledge, readily adapt the same for use under various conditions of service.

What is claimed as the invention:

1. A steering indicator including gearing to transmit rotation of a steering shaft to a worm drive gear, variable resistance value change means operated by said worm drive gear, a first electrical circuit including an electrically actuated indicating meter and variable resistances, the variable resistances in said first electrical circuit being varied as said resistance value change means are operated by said worm drive gear to give a reading on said meter, and a second electrical circuit having variable resistances, said second electrical circuit also including indicator lights, the resistance values in said second electrical circuit being varied at the same time the resistance values in said first electrical circuit are varied by operation of said worm drive gear and resistance value change means, whereby the resistance value in said second electrical circuit will decrease to enable said second electrical circuit indicator lights to brighten as said steering shaft is turned to an extreme position.

2. The steering indicator of claim 1 including a brush that is moved by said resistance value change means to vary the resistance value of said second electrical circuit.

3. The steering indicator of claim 2 wherein said resistance value change means are actuated by a common control.

4. The steering indicator of claim 1 wherein said meter includes an indicating needle that is moved in accordance with the movement of said steering shaft.

5. A steering indicator including gearing to transmit rotation of a steering shaft within a steering column to a worm drive gear, variable resistance value change means operated by said worm drive gear, electrical supply means, a first electrical circuit, including variable resistances and being actuated by said electrical supply means, said first electrical circuit including an electrically actuated current meter, the variable resistances in said first electrical circuit being varied as said resistance value change means are operated by said worm drive gear to vary the electrical current in said first electrical circuit, there being a brush that is moved by said resistance value change means to vary the resistance of said first electrical circuit, and said brush being in contact with said variable resistances in said first electrical circuit, whereby rotation of said steering shaft is indicated by said current meter, and a second electrical circuit having variable resistances, said second electrical circuit also including indicator lights, the resistance values in said second electrical circuit being varied at the same time the resistance values in said first electrical circuit are varied by operation of said worm drive gear and resistance value change means, whereby the resistance value in said second electrical circuit will decrease to enable said second electrical circuit indicator lights to brighten as said steering shaft is turned to an extreme position.

6. The steering indicator of claim 5 wherein said resistance value change means is a gear meshing with said worm drive gear, there being a brush that is moved by said resistance value change means to vary the resistance of said first electrical circuit.

7. The steering indicator of claim 6 wherein said brush is in contact with a meter resistance in said first electrical circuit in order to vary resistance values in said first electrical circuit.

8. The steering indicator of claim 5 including a completely enclosed drive assembly within said steering column.

9. The steering indicator of claim 5 wherein said meter is calibrated by adjustable resistances when wheels are turned to extreme positions and the meter needle centers automatically.

10. The steering indicator of claim 8 wherein said meter includes a needle, with said needle falling to the extreme left position when power is off.

* * * * *